May 13, 1941.     L. S. WILLIAMS     2,241,692
MEASURING DEVICE
Filed Oct. 25, 1939
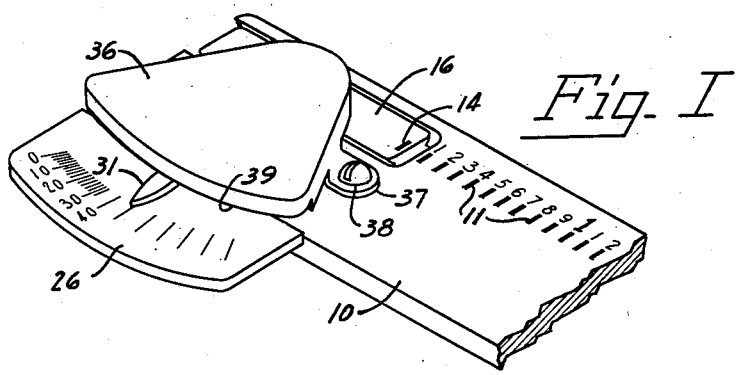
Fig. I
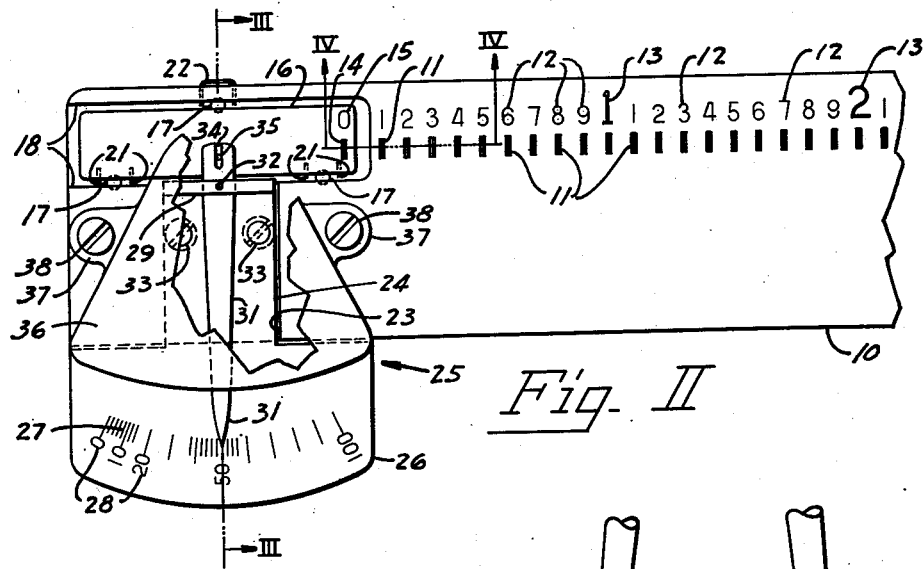
Fig. II
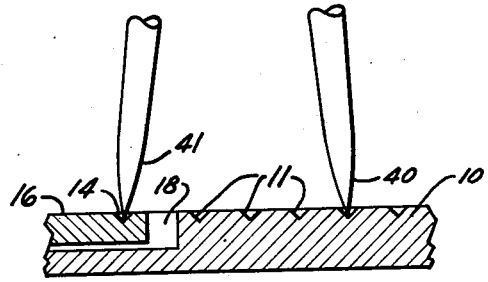
Fig. IV
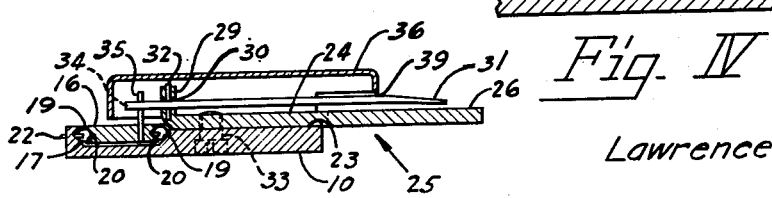
Fig. III
Lawrence S. Williams
INVENTOR
BY Marshall & Marshall
ATTORNEYS Patented May 13, 1941

2,241,692

UNITED STATES PATENT OFFICE 2,241,692

MEASURING DEVICE

Lawrence S. Williams, Toledo, Ohio, assignor to Toledo Scale Company, a corporation of New Jersey Application October 25, 1939, Serial No. 301,152

8 Claims. (Cl. 33—107)

This invention relates generally to measuring instruments, and more particularly to an instrument for adjusting divider or trammel points to a micrometer dimension.

In accurately "laying out" dimensions to thousandths of an inch, or any other dimension which cannot be obtained directly by measuring with an accurately graduated steel scale, it has heretofore been necessary to align the work-piece upon a surface plate and then determine the distances required by means of vernier or micrometer height gauges or similar micrometric devices. Frequently the time required for aligning the piece upon the surface plate is greater than that required for the actual "lay out" and furthermore a great deal of skill is required for the operation.

The object of the present invention is the provision of improved means for adjusting the points of dividers, trammels or similar instruments to a micrometric dimension.

A further object is the provision of an instrument which enables workmen having even less than the ordinary skill to obtain accurate space settings of measuring instruments; and, A further object is the provision of an instrument of the type referred to which is compact, simple and inexpensive to produce.

These, and other objects and advantages will be apparent from the following description in which reference is had to the accompanying drawing, illustrating a preferred embodiment of the invention and wherein similar reference numerals refer to similar parts throughout the several views.

In the drawing—

Fig. I is a fragmentary perspective view of a device embodying the invention.

Fig. II is a fragmentary plan view thereof, a part being broken away to more clearly show the construction of the indicating mechanism.

Fig. III is a sectional view substantially along the line III—III of Fig. II; and, Fig. IV is a fragmentary longitudinal section substantially along the line IV—IV of Fig. II and showing in detail the manner in which the points of a divider are adjusted.

Referring to the drawing in detail:

The device comprises a base 10, which is in the form of an elongated strip or narrow plate, provided adjacent one of its edges with a series of sharply defined V notches 11. These notches may be spaced according to units of any desired system of lineal mensuration. In the illustrated embodiment the distance between two adjacent notches 11 is .1" and the value of each notch is clearly indicated by numerals. The numerals 12 represent tenths of an inch while each tenth numeral 13, which is slightly larger in size, represents full inches.

For a reason which will presently become apparent, the zero notch 14 of this series and its designating numeral 15 are situated on a small rectangular plate 16. This plate is slidably mounted on bearing balls 17 in a narrow rectangular recess 18 milled longitudinally from the end into the upper face of the base 10. The longitudinal walls of the recess 18 are undercut to form a V groove 19 and the longitudinal edges of the plate 16 are similarly provided with a V groove 20. These V grooves form ways in which bearing balls 17 are seated. Pins 21, studded into one of the edges of the plate 16, one on each side of the balls 17, prevent these from shifting an appreciable amount with respect to the plate. A small wire staple 22 penetrating a wall of the recess performs the same function for the ball 17 which supports the opposite edge of the plate 16. The plate 16 is thus supported in a manner which offers very little frictional resistance to sliding motion. The grooves, balls and the plate are so designed and proportioned that the upper face of the plate 16 is flush with the face of the base 10. In a recess 23, milled transversely in the upper face of the base so that its longitudinal axis approximately bisects the recess 18, is located an arm 24 of a substantially T-shaped plate 25 having a portion 26 which projects beyond the edge of the base 10. The upper face of this portion 26 is provided with a series of indicia 27 whose values are identified by numerals 28. The end 29 of the inner arm 24 of the T-shaped plate 25 is bent upwardly at right angles to its face and this bent up portion has a slotted opening 30 through which an indicator 31 projects. This indicator is fulcrumed on a pintle 32 driven into a hole drilled through the up-turned portion 29 and passing freely but snugly through a hole in the indicator 31. The T-shaped plate 25 is securely held in position by screws 33 which pass through holes in the base 10 and threaded into apertures in the portion 24 of the T-shaped plate 25. This pin 32, about which the indicator 31 turns, is coincident with that point from which the graduations of the series 27 radiate. To actuate the indicator 31, a slot 34, accurately cut into that end of this indicator which overlies the plate 16, receives a drive pin 35, perpendicularly studded into the plate 16.

The indicator 31 is preferably made from tool or high carbon steel so that that portion in which the hole for the pintle 32 and the slot 34 are located may be hardened. The pintle 32 and the pin 35 are also made of hardened steel so as to minimize wear between the contacting surfaces.

To house and protect the indicator 31 and its operative connection to the plate 16, as well as its fulcrum, a substantially fan-shaped stamped cover 36 provided with ears 37 is fastened, by means of screws 38, to the upper face of the base 10. The lower edge of a portion of the arcuate wall 39 (see Fig. III) is milled away to form a slot through which the index end of the indicator 31 projects.

The distance between the zero notch 14 and the center of the drive pin 35, as well as the location of the fulcrum pintle 32, must be so designed and proportioned that when the centers of the first notch 11 in the series on the base 10, and the center of the notch 14 on the plate 16 are exactly $\frac{1}{10}''$ apart, the index point of the indicator 31 points to the zero indicium in the series 27 marked on the extending portion of the T-shaped plate 25. The lengths of the lever arms of the indicator 31 must also be so proportioned that when the distance between the first notch in the series on the base 10 and the notch 14 is increased to .2'', by sliding the plate 16 on its bearing balls, the index point of the indicator must point to the graduation numbered "100" in the series 27. Preferably, there are fifty graduations in this series so that each graduation represents .002''. Since these graduations may be spaced a substantial distance apart it is readily possible to determine distances to within one-thousandths of an inch or less with the device.

The operation of the device is as follows:

When it is desired to space points 40 and 41 of a divider (Fig. IV) exactly 1.318'' apart the point 40 is placed into the 1.3'' notch in the base 10 and the other point into the zero notch 14 in the plate 16. The divider points are then adjusted, while the point 41 is in this zero notch, by the means provided, usually a screw, until the plate 16 has shifted on its bearing balls a distance sufficient to cause the drive pin 35, which is studded in the plate 16, to turn the indicator 31 about its fulcrum pin 32 until its index points to the .018'' indicium in the series 27. It is obvious that the base 10 may be made of any reasonable length and graduated with a sufficient number of notches 11 so that spacings within the tolerance of .001'' of any desired reasonable length can be readily obtained.

Having described the invention, I claim:

1. In a device of the class described, in combination, a base, a series of sharply defined aligned notches, a majority of said notches being cut into said base, a plate having a sharply defined notch mounted in a recess in said base, said notch in said plate lying in alignment with and forming one of said series in said base, said plate being rectangular in shape and adapted to move towards and away from said series of notches in said base, means for antifrictionally mounting said plate in said base, said antifriction mounting means comprising grooves in longitudinal walls of such recess, similar grooves in longitudinal edges of said plate, a plurality of bearing balls mounted in said grooves, means for retaining said bearing balls in said grooves and said retaining means comprising pins studded into said plate and extending into the space formed by said grooves and spaced a substantial distance on each side of each of said balls, on one longitudinal side of said plate and a substantially U-shaped wire staple having its legs penetrating a wall of said recess in said base and extending into the space formed by said grooves on the other longitudinal side of said plate, one of said legs of said staple being spaced on each side of the bearing ball in said groove.

2. In a device of the class described, in combination, a base, a series of sharply defined aligned notches, a majority of said notches being cut in said base, a plate having a sharply defined notch slidably mounted in said base, said plate being disposed in said base so that said notch lies in alignment with and forms one of the aforementioned series of notches, an arcuate series of indicia marked on said base, an indicator rotatably mounted on said bases for cooperation with said arcuate series of indicia, means fixed to said slidably mounted plate for rotating said indicator for cooperation with said arcuate series of indicia upon movement of said slidably mounted plate, said indicator having a longitudinally disposed slot adjacent its end and said means for rotating said indicator comprising a member fixed to said plate and engaging said slot.

3. In a device of the class described, in combination, a base, a series of sharply defined aligned notches, a majority of said notches being cut in said base, a plate having a sharply defined notch slidably mounted in said base, said plate being disposed in said base so that said notch lies in alignment with and forms one of the aforementioned series of notches, an arcuate series of indicia marked on said base, an indicator rotatably mounted on said base for cooperation with said arcuate series of indicia, means fixed to said slidably mounted plate for rotating said indicator for cooperation with said arcuate series of indicia upon movement of said slidably mounted plate, said indicator having a longitudinally disposed slot adjacent its end, said means for rotating said indicator comprising a member fixed to said plate and engaging said slot and a member secured to said base for housing a substantial portion of said indicator.

4. In a device of the class described, in combination, an elongated base having a series of aligned sharply defined V notches adjacent one of its edges, said notches being spaced according to units of a system of linear mensuration and adapted selectively to receive a divider point, a plate, means mounting said plate on said base for limited free movement in the direction of alignment of said notches, said plate having a notch disposed in alignment with said series of notches and adapted to receive the other point of such divider, said plate being adapted for movement on said mounting means when such divider points are being adjusted and indicating means actuated upon movement of said plate for indicating a fraction of the total distance between such divider points.

5. In a device of the class described, in combination, a base, a series of sharply defined aligned notches, a majority of said notches being cut into said base, a plate having a sharply defined notch, said notch in said plate lying in alignment with and forming one of said series, means for mounting said plate on said base for limited free movement in the direction of alignment of said notches, means for antifrictionally mounting said plate in said base, said antifriction mounting means comprising grooves in longitudinal walls of such recess, similar grooves in longitudinal edges of said plate, a plurality of bearing balls mounted in said grooves and means for retaining said bearing balls in said grooves.

6. In a device of the class described, in combination, a base having a series of sharply defined aligned notches cut therein, a plate having a sharply defined notch cut therein, said notch in said plate lying in alignment with and cooperating with said series cut in said base, antifriction means mounting said plate on said base to be shifted towards and away from said series of notches in said base, said antifriction mounting means comprising grooves in longitudinal walls of such recess, similar grooves in longitudinal edges of said plate and a plurality of bearing balls mounted in said grooves.

7. In a device of the class described, in combination, a base having a series of sharply defined aligned notches formed therein, a plate having a sharply defined notch formed therein, said plate being disposed on said base so that said notch therein lies in alignment with and cooperates with said aforementioned series of notches, means slidably mounting said plate upon said base, an arcuate series of indicia marked on said base, an indicator rotatably mounted for cooperation with said arcuate series of indicia and means fixed to said slidably mounted plate for rotating said indicator for cooperation with said arcuate series of indicia upon movement of said slidably mounted plate.

8. In a device of the class described, in combination, a base, a series of sharply defined aligned notches formed in said base, a plate having a sharply defined notch formed therein, means shiftably mounting said plate on said base for movement in the direction of alignment of said series of notches, said notch in said plate being in alignment with and cooperating with said series in said base, said notch in said plate when said plate is in its normal position being spaced a distance from its adjacent notch equal to the distance between two other notches of said series and means for continuously visually indicating the distance between said notch in said plate and said adjacent notch in said series when said plate is being shifted.

LAWRENCE S. WILLIAMS.